US010625356B2

United States Patent
Prokopiak et al.

(10) Patent No.: US 10,625,356 B2
(45) Date of Patent: Apr. 21, 2020

(54) ELECTRICAL CONNECTION TAPE

(71) Applicant: Alpha Assembly Solutions Inc., Waterbury, CT (US)

(72) Inventors: Steven Dane Prokopiak, Toms River, NJ (US); Sanyogita Arora, Berkeley Heights, NJ (US); Ranjit S. Pandher, Plainsboro, NJ (US); Ellen S. Tormey, Princeton Junction, NJ (US); Bawa Singh, Marlton, NJ (US)

(73) Assignee: ALPHA ASSEMBLY SOLUTIONS INC., Waterbury, CT (US)

( * ) Notice: Subject to any disclaimer, the term of this patent is extended or adjusted under 35 U.S.C. 154(b) by 179 days.

(21) Appl. No.: 15/549,535

(22) PCT Filed: Feb. 10, 2016

(86) PCT No.: PCT/US2016/017331
§ 371 (c)(1),
(2) Date: Aug. 8, 2017

(87) PCT Pub. No.: WO2016/130662
PCT Pub. Date: Aug. 18, 2016

(65) Prior Publication Data
US 2018/0036818 A1    Feb. 8, 2018

Related U.S. Application Data

(60) Provisional application No. 62/114,820, filed on Feb. 11, 2015.

(51) Int. Cl.
*B23K 1/00*    (2006.01)
*H01R 4/04*    (2006.01)
(Continued)

(52) U.S. Cl.
CPC .............. *B23K 1/0016* (2013.01); *B23K 3/04* (2013.01); *B23K 35/00* (2013.01);
(Continued)

(58) Field of Classification Search
CPC ........ B23K 1/0016; B23K 3/04; B23K 35/00; B23K 35/0238; B23K 35/0244;
(Continued)

(56) References Cited

U.S. PATENT DOCUMENTS 4,667,869 A    5/1987  Gen et al.
5,904,782 A    5/1999  Diep-Quang
(Continued)

FOREIGN PATENT DOCUMENTS

EP    2017315    1/2009
EP    2055756    5/2009
(Continued)

OTHER PUBLICATIONS

Machine Translation of JP-2015009394-A (Year: 2015).*

*Primary Examiner* — Daniel McNally
(74) *Attorney, Agent, or Firm* — Carmody Torrance Sandak & Hennessey LLP

(57) ABSTRACT

A thermal managing electrical connection tape includes a carrier film and a composition including solder powder, with the composition being applied to the carrier film. The composition includes a soldering flux having the solder powder disposed therein. The composition contains between about 50 wt % and about 70 wt % soldering flux. The composition further contains between about 30 wt % and about 50 wt % solder powder. A method of fabricating a thermal managing electrical connection tape includes providing a composition including at least one of a soldering flux and epoxy and/or acrylic, adding a solder powder to the composition, casting the composition on a carrier film,
(Continued)

drying the carrier film in a drying furnace to form a dried tape, and cutting the dried tape to a desired width to form a thermal managing electrical connection tape.

8 Claims, 4 Drawing Sheets

(51) Int. Cl.
    *B23K 35/02*     (2006.01)
    *B23K 35/00*     (2006.01)
    *B23K 35/26*     (2006.01)
    *C09J 7/10*     (2018.01)
    *B23K 35/362*     (2006.01)
    *B23K 3/04*     (2006.01)
    *B23K 101/36*     (2006.01)

(52) U.S. Cl.
    CPC ...... *B23K 35/0238* (2013.01); *B23K 35/0244* (2013.01); *B23K 35/262* (2013.01); *B23K 35/362* (2013.01); *C09J 7/10* (2018.01); *H01R 4/04* (2013.01); *B23K 2101/36* (2018.08); *C09J 2201/28* (2013.01); *C09J 2203/326* (2013.01); *C09J 2433/00* (2013.01); *C09J 2463/00* (2013.01)

(58) Field of Classification Search
    CPC ........ B23K 35/262; B23K 35/362; C09J 7/10; H01R 4/04
    See application file for complete search history.

(56) References Cited

U.S. PATENT DOCUMENTS

| | | | |
|---|---|---|---|
| 7,022,266 B1* | 4/2006 | Craig | C09D 11/52 148/24 |
| 9,656,353 B2 | 5/2017 | Miyauchi et al. | |
| 2002/0056925 A1* | 5/2002 | Kang | H01L 24/83 257/784 |
| 2004/0026484 A1* | 2/2004 | Yamashita | B23K 1/0016 228/180.22 |
| 2005/0104046 A1 | 5/2005 | Wang et al. | |
| 2005/0106369 A1 | 5/2005 | Wang et al. | |
| 2007/0260325 A1* | 11/2007 | Wenz | A61L 24/001 623/23.62 |
| 2010/0059872 A1* | 3/2010 | Katsurayama | C09J 9/02 257/686 |
| 2010/0155964 A1 | 6/2010 | Katsurayama et al. | |
| 2011/0111537 A1 | 5/2011 | Cheng et al. | |
| 2012/0073869 A1 | 3/2012 | Kishi et al. | |

FOREIGN PATENT DOCUMENTS

| | | | |
|---|---|---|---|
| JP | 59-21650 | | 2/1984 |
| JP | 61-276873 | | 12/1986 |
| JP | 08-250846 | | 9/1996 |
| JP | 2001-164210 | | 6/2001 |
| JP | 2005-150120 | | 6/2005 |
| JP | 2008-300443 | | 12/2008 |
| JP | 2011-123277 | | 6/2011 |
| JP | 2015-9394 | | 1/2015 |
| JP | 2015009394 A | * | 1/2015 |
| KR | 10-2009-0045195 | | 5/2009 |
| TW | 200801151 A | | 1/2008 |
| TW | 201017691 A | | 5/2010 |
| TW | 201230217 A | | 7/2012 |
| WO | 98/08362 | | 2/1998 |
| WO | 2007/125650 A1 | | 11/2007 |
| WO | 2013/062095 A1 | | 5/2013 |

* cited by examiner

ELECTRICAL CONNECTION TAPE

CROSS-REFERENCE TO RELATED APPLICATIONS

This application claims the benefit under 35 U.S.C. § 119(e) of U.S. Application Ser. No. 62/114,820, titled "ELECTRICAL CONNECTION TAPE," filed Feb. 11, 2015, which is incorporated herein by reference in its entirety.

BACKGROUND OF THE DISCLOSURE

The present disclosure is directed to materials for joining electrical or mechanical components, and more particularly to materials for attaching electronic components and associated devices onto electronic substrates.

As electronic devices become more advanced, the ability to quickly connect increasingly fine pitched metalized features among combinations of substrates is becoming increasingly difficult. Traditionally, depending on substrate type, these connections have been produced by screen printing solder paste or anisotropic conductive paste (ACP), applying anisotropic conductive film (ACF), or by use of preforms, wave soldering, wire bonding, or solder wire. However, each of these methods has individual drawbacks. Screen printing technology is pitch limited and not applicable in many applications, such as flex attach. ACF is highly pressure dependent, offers only a low current carrying capacity connection, degrades over time, and is costly to manufacture. Preforms need to be placed in or around solder deposits to keep them in position during processing. Wave soldering requires large amounts of energy and is not applicable in many attach applications. Wire bonding is a relatively slow and costly process with high reliability issues for many applications. Lastly, solder wire is also a slow process and is prone to splattering flux or solder to unwanted areas of a substrate.

SUMMARY

One aspect of the present disclosure is directed to a thermal managing electrical connection tape comprising a carrier film and a composition including solder powder, with the composition being applied to the carrier film.

Embodiments of the tape further may include providing a soldering flux in the composition, with the soldering flux having the solder powder disposed therein. The composition may contain between about 50 wt % and about 70 wt % soldering flux. The composition further may contain between about 30 wt % and about 50 wt % solder powder. The composition may be patterned with epoxy and/or acrylic. The composition may include at least one of epoxy and acrylic. The composition may include "suction cup" morphology. The composition may include filler materials that increase reliability at high pressures. The filler material may include glass frit. The composition further may include additives for process temperature and residue evaluations. The additives may include at least one of Leuco, Leuco-like, and liquid crystal "thermochromic" dyes.

Another aspect of the present disclosure is directed to a method of fabricating a thermal managing electrical connection tape. In one embodiment, the method comprises: providing a composition including at least one of a soldering flux and epoxy and/or acrylic; adding a solder powder to the composition; casting the composition on a carrier film; drying the carrier film in a drying furnace to form a dried tape; and cutting the dried tape to a desired width to form a thermal managing electrical connection tape.

Embodiments of the method further may include the composition having about 10 wt % to about 70 wt % solder powder. The composition further may include about 30 wt % to about 90 wt % soldering flux. Drying the tape in a drying furnace may include drying the tape at 10-15° C. below a boiling point of a solvent of the composition for 5-15 minutes.

Another aspect of the present disclosure is directed to a method of fabricating an assembly comprising a thermal managing electrical connection tape. In one embodiment, the method comprises: laminating a tape between two substrates containing metallization to be connected, the tape including a resilient carrier film and a composition having soldering flux and solder powder applied to the carrier film; heating the laminated tape and substrates to a melting temperature of the solder powder; as the temperature raises, melting the carrier film on which the composition is applied; once bulk melting of the carrier film has begun, the soldering flux deoxidizes and acts as a transport mechanism for the solder powder; when the melting temperature is reached, the deoxidized solder wets only the substrate metallization, and stranded solder powder is transported by a liquid flux to a desired metallization area; and cooling the tape.

Embodiments of the method further may include laminating of the tape between the two substrates at a temperature 90-187° C. and a pressure 0.02-33 psi for 1-10 seconds. The melting temperature of the solder powder is between 137-289° C.

DETAILED DESCRIPTION

Figure 1:
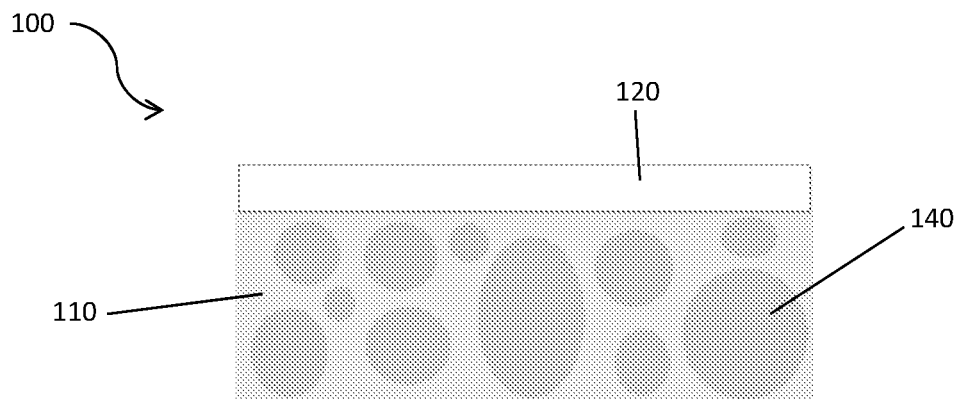
FIG. 1 is a schematic view of a tape of an embodiment of the present disclosure.

This invention is not limited in its application to the details of construction and the arrangement of components set forth in the following description or illustrated in the drawings. The invention is capable of embodiments and of being practiced or of being carried out in various ways beyond those exemplarily presented herein.

Thermal managing electrical connection tape of embodiments of the present disclosure is designed to take advantage of a metal's affinity for other metals. A thermal managing electrical connection tape of embodiments of the present disclosure includes a resilient film having a flux composition, including soldering flux and a solder powder, applied to the film. The tape is laminated (or pressed in place) between two substrates containing metallization to be connected. In certain embodiments, the substrates can be fabricated from any suitable metal, such as copper, silver, tin, gold, etc. The thermal managing electrical connection tape, sometimes referred to as "TMECT," is then heated in accordance with a temperature profile that reaches a melt temperature of the particular metal or alloy used in the substrate. In certain embodiments, the temperatures and the times are dependent on the metal or alloy used, the film thickness and the type of substrate. For example, the temperature to be applied can be 10-20° C. above the melting temperature of the metal or alloy, and the duration can be between 20-30 seconds. As the temperature rises, the tape having the resilient carrier film and the soldering flux/solder powder composition melts. Once bulk melting has begun, the flux both deoxidizes and acts as a transport mechanism for the solder. When the solder alloy melt temperature is reached, the deoxidized solder wets only the substrate metallization, and the stranded solder is transported by the liquid flux to the desired metallization areas. After the solder has been transported to the metallization, the entire sample is allowed to cool. The final product is two substrates electrically connected on the metalized areas only, and contains completely electrically isolated connections.

Referring to FIG. 1, a thermal managing electrical connection tape is generally indicated at 100, and includes a resilient film 120 having a soldering flux composition 110 applied to the film. As shown, the flux composition 110 includes a soldering flux and a solder powder 140 incorporated or embedded within the soldering flux. In some embodiments, the film 120 may include a carrier film suitable for material applications. The flux composition 110 may include a solvent, polymer, an activator, a rosin or resin, a corrosion inhibitor, or combinations of these constituents. In some embodiments, the solvent may be methylcyclohexane or ethanol. In some embodiments, the polymer may be Versamid® 940 or Polyvinylpyrrolidone (PVP). In some embodiments, the activator may be a dicarboxylic acid such as adipic acid or may be dibromobutendiol, or iodobenzoic acid, or cyclohexylamine HCl. In some embodiments, the resin may be, for example, Dymerex. In some embodiments, the corrosion inhibitor may be, for example, benzotriazole.

The solder powder 140 is compatible with the soldering flux of the flux composition 110. In some embodiments, solder powder 140 may include a lead-free solder. In some embodiments, solder powder 140 may include a mixture of tin, silver, and copper. For example, solder powder 140 may include SAC305 solder alloy. Solder powder 140 may include particles of any size compatible with the application. For example, solder powder 140 may include Type 3 particle sizes of 25 μm to 45 μm. Any suitable solder compatible with the flux composition 110 can be provided.

The flux composition 110 and the solder powder 140 may be in any mixture composition. The composition may vary depending on the end application. In some embodiments, the flux composition 110 may include about 10 wt % to about 70 wt % solder powder 140 and about 30 wt % to about 90 wt % soldering flux. In other embodiments, the composition 110 may include about 30 wt % to about 50 wt % solder powder 140 and about 50 wt % to about 70 wt % soldering flux. For example, the flux composition 110 may include a slurry containing about 40 wt % solder powder 140 and about 60 wt % soldering flux. The slurry may be cast on the film 120, dried in a drying furnace and slit to the desired film width to create a TMECT. For example, the drying temperature may be approximately 10-15° C. below a boiling point of the solvent for approximately 5-15 minutes, depending on the cast thickness.

Figure 2:
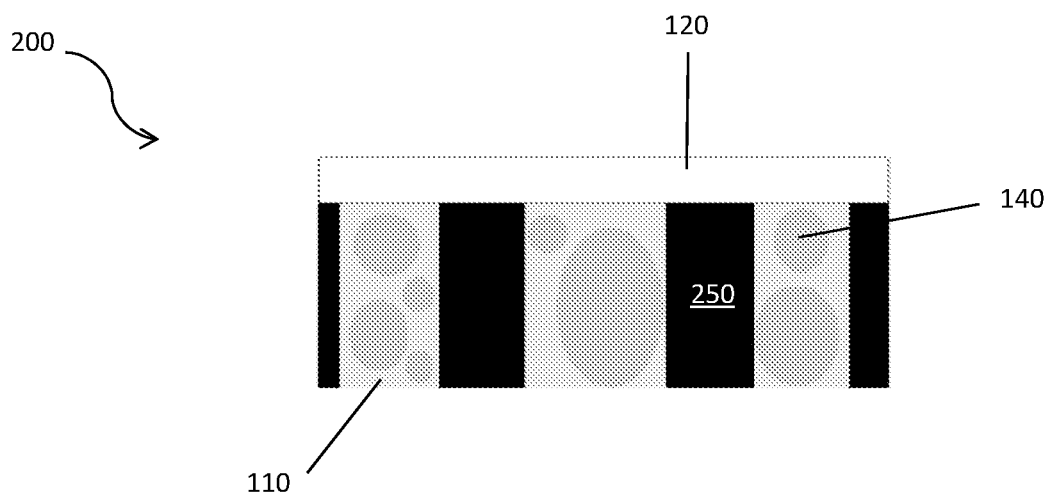
FIG. 2 is a schematic view of a tape of another embodiment of the present disclosure.

Referring to FIG. 2, a TMECT, generally indicated at 200, can also be patterned with epoxy and/or acrylic 250, which is interspersed within the flux composition 110. The patterned epoxy and/or acrylic TMECT 200 is designed to add strength and the ability to increase a bond line of a processed substrate. The epoxy and/or acrylic TMECT 250 may also limit solder shorting potential.

Figure 3:
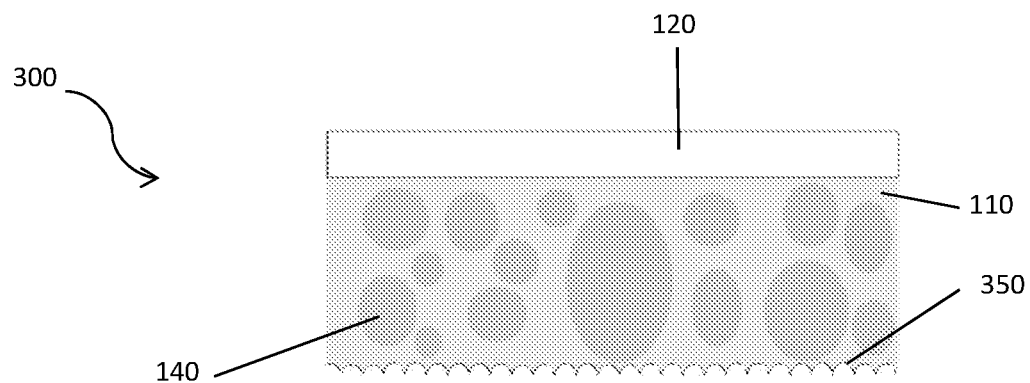
FIG. 3 is a schematic view of a tape having suction cup morphology of another embodiment of the present disclosure.

Referring to FIG. 3, a TMECT, generally indicated at 300, can be processed to construct "suction cup" morphology, indicated at 350, which is formed on a bottom of the tape. The suction cup morphology 350 can eliminate a typical lamination step required for anisotropic conductive films by making the tape 300 able to be initially pressed and fixed to its desired substrate without added heat.

Figure 4:
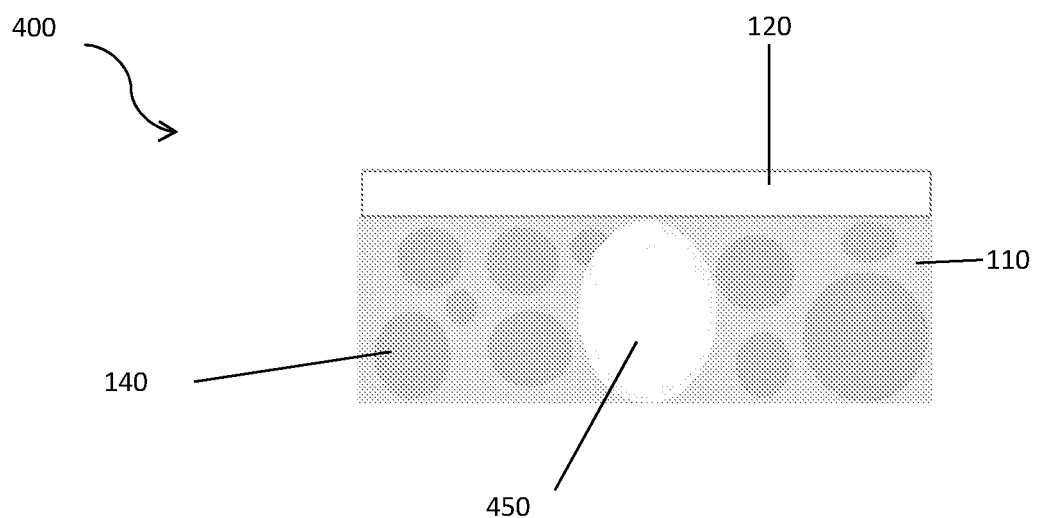
FIG. 4 is a schematic view of a tape of another embodiment of the present disclosure.

Referring to FIG. 4, a TMECT, generally indicated at 400, may contain filler materials, such as glass frit 450, to make the process more reliable at higher pressures.

Figure 5:
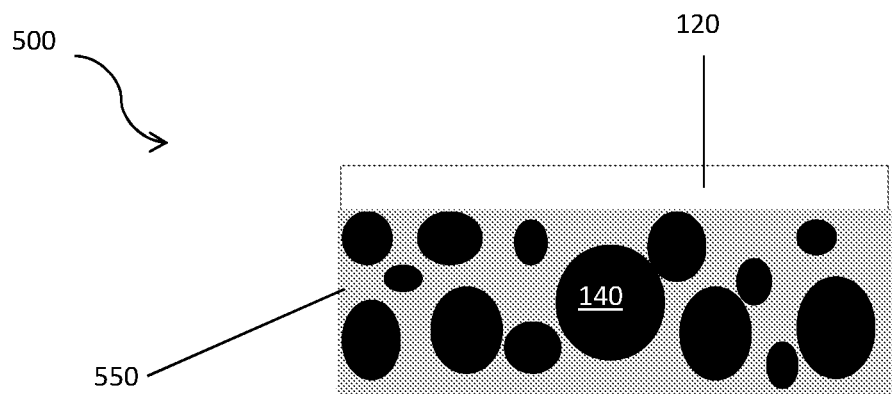
FIG. 5 is a schematic view of a tape of another embodiment of the present disclosure.

Referring to FIG. 5, a TMECT, generally indicated at 500, may also contain additives 550, such as Leuco, Leuco-like, or liquid crystal "thermochromic" dyes for process temperature and residue evaluations.

Figure 6:
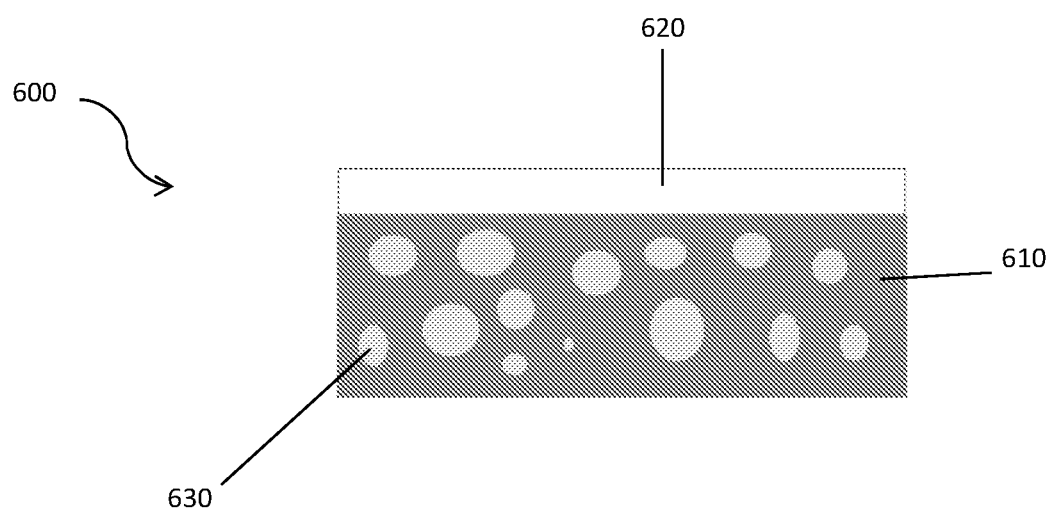
FIG. 6 is a schematic view of a tape of another embodiment of the present disclosure.

The tapes 100, 200, 300, 400, 500 of FIGS. 1-5, respectively, contrast with anisotropic conductive paste (ACF), an example of which is shown in FIG. 6. As shown, a tape generally indicated at 600 includes a carrier film 620 and a paste 610 (epoxy and/or acrylic) applied to the film. In one embodiment the paste 610 includes conductive particles 630 embedded in the paste. A typical ACF includes a conducting particle, for example, a polymer plated with layers of Ni/Au, in an epoxy and/or acrylic matrix. ACF can be laminated in place by curing the epoxy and/or acrylic, which essentially glues the film to the substrate. Electrical connections between metalized substrates are then made by applying between 1-100 mPa of pressure (film and substrate dependent) to the substrates, thus crushing the conductive particles between the metallization and creating a low current carrying capacity connection.

In some embodiments, the thermal managing electrical connection tape of embodiments of the present disclosure can be most closely related to the ACF platform, but can be used as a replacement for any of the above-identified compositions and processes. The TMECT is highly reliable in connecting fine pitched features, does not require pressure, can be directly attached to the substrate without use of paste, offers a low resistance connection, does not need to be refrigerated, inexpensive to manufacture and in some instance can eliminate a classic ACF lamination and standard perform placement process step. The TMECT can also easily be adapted for standard die attach processes such as Die transfer film (DTF) and wafer backside (WBS) processing.

Figure 7:
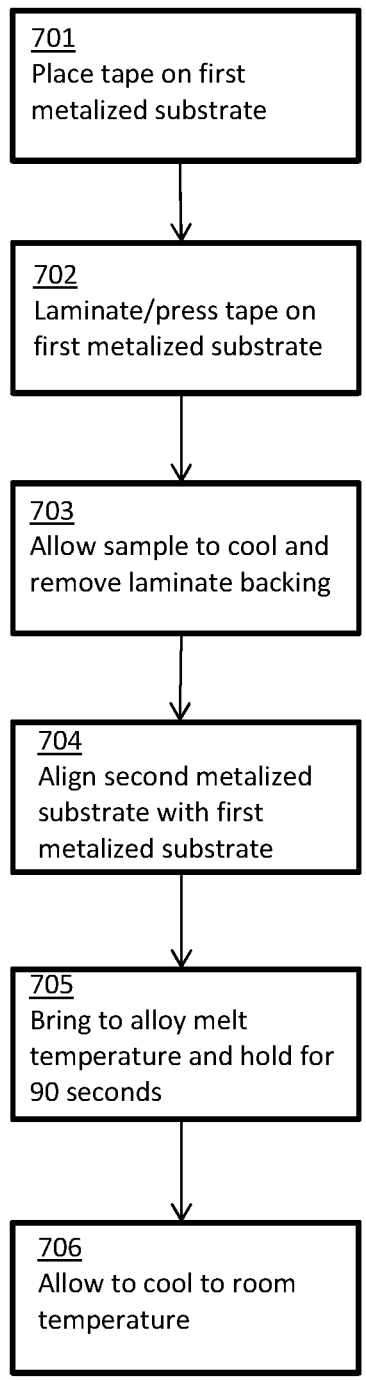
FIG. 7 is a diagram showing use of thermal managing electrical connection tape.

FIG. 7 is a process diagram illustrating a method of using thermal managing electrical connection film as an ACF replacement. The first step 701 includes placing the film on a first metalized substrate. Next, the film is laminated or pressed onto the first metalized substrate (step 702). The sample is allowed to cool and the laminate backing is removed in step 703. After cooling, the second metalized substrate is aligned with the first metalized substrate (step 704) to form an assembly. The assembly is then brought to the alloy melt temperature and held for about 90 seconds (step 705). Finally, the assembly is allowed to cool to room temperature (step 706).

In a certain embodiment, a method of fabricating an assembly comprising a thermal managing electrical connection tape includes laminating a tape between two substrates containing metallization to be connected, with the tape including a resilient carrier film and a composition having soldering flux and solder powder applied to the carrier film.

The laminated tape and substrates is heated to a melting temperature of the solder powder. As the temperature rises, the carrier film melts on which the composition is applied. Once bulk melting of the carrier film has begun, the soldering flux deoxidizes and acts as a transport mechanism for the solder powder. When the melting temperature is reached, the deoxidized solder wets only the substrate metallization, and stranded solder powder is transported by a liquid flux to a desired metallization area. Finally, the tape is cooled. Embodiments of the method include laminating of the tape between the two substrates at a temperature 90-187° C. and a pressure 0.02-33 psi for 1-10 seconds. Melting temperature of the solder powder is between 137-289° C.

EXAMPLE

A thermal managing electrical connection tape including a carrier film and a flux composition having soldering flux and solder powder was prepared. The tape was prepared by adding 15.5 wt % methylcyclohexane to a glass or stainless steel container with mixing capability. About 46.6 wt % ethanol was added to the solution and mixed until homogeneous. Next, about 15.6 wt % of Versamid® 940 was added to the solution, and mixed until the solution was clear. Approximately 9.6 wt % of Dymerex was then added to the solution and again mixed until the solution was clear. Then, about 0.2 wt % iodobenzoic acid was added to the solution and mixed until the solution was clear. About 1.4 wt % of dibromobutendiol was then added to the solution and mixed until the solution was clear. Next, about 0.2 wt % cyclohexylamine HCl was added to the solution and mixed until the solution was clear. About 10.8 wt % adipic acid was then added to the solution and mixed until the solution was clear. Finally, about 0.1 wt % benzotriazole was added to the solution and mixed until the solution was clear.

A solder powder, SAC305 Type 3, was then added to the soldering flux solution to create a slurry comprising about 40 wt % solder powder and 60 wt % flux film. The composition may vary depending on the end application. The slurry was cast with a carrier film into a tape, dried in a drying furnace, and slit to the desired tape width. Depending on the cast thickness, the drying temperature is approximately 10-15° C. below a boiling point of the solvent for approximately 5-15 minutes.

It is to be appreciated that embodiments of the compositions and methods discussed herein are not limited in application to the details of construction and the arrangement set forth herein. The compositions and methods are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiment.

Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the disclosure. Accordingly, the foregoing description and drawings are by way of example only.

What is claimed is:

1. A thermal managing electrical connection tape comprising:
    a carrier film; and
    a composition including solder powder disposed in a solder flux, the composition being applied to the carrier film,
    wherein the composition contains between about 50 wt. % and about 70 wt. % soldering flux and between about 30 wt. % and about 50 wt. % solder powder.

2. The thermal managing electrical connection tape of claim 1, wherein the composition includes filler materials that increase reliability at high pressures.

3. The thermal managing electrical connection tape of claim 2, wherein the filler material includes glass frit.

4. The thermal managing electrical connection tape of claim 1, wherein the composition further includes additives for process temperature and residue evaluations.

5. The thermal managing electrical connection tape of claim 4, wherein the additives include at least one of Leuco, Leuco-like, and liquid crystal thermochromic dyes.

6. The thermal managing electrical connection tape of claim 1, wherein the composition is patterned with epoxy and/or acrylic.

7. The thermal managing electrical connection tape of claim 1, wherein the composition includes at least one of epoxy and acrylic.

8. The thermal managing electrical connection tape of claim 1, wherein the composition includes a suction cup-shaped morphology.

* * * * *